CIRCUIT ARRANGEMENT FOR INDICATING THE OCCURRENCE
OF AN OVERLOAD CONDITION ON A PLURALITY
OF INPUT POINTS
Filed July 26, 1965
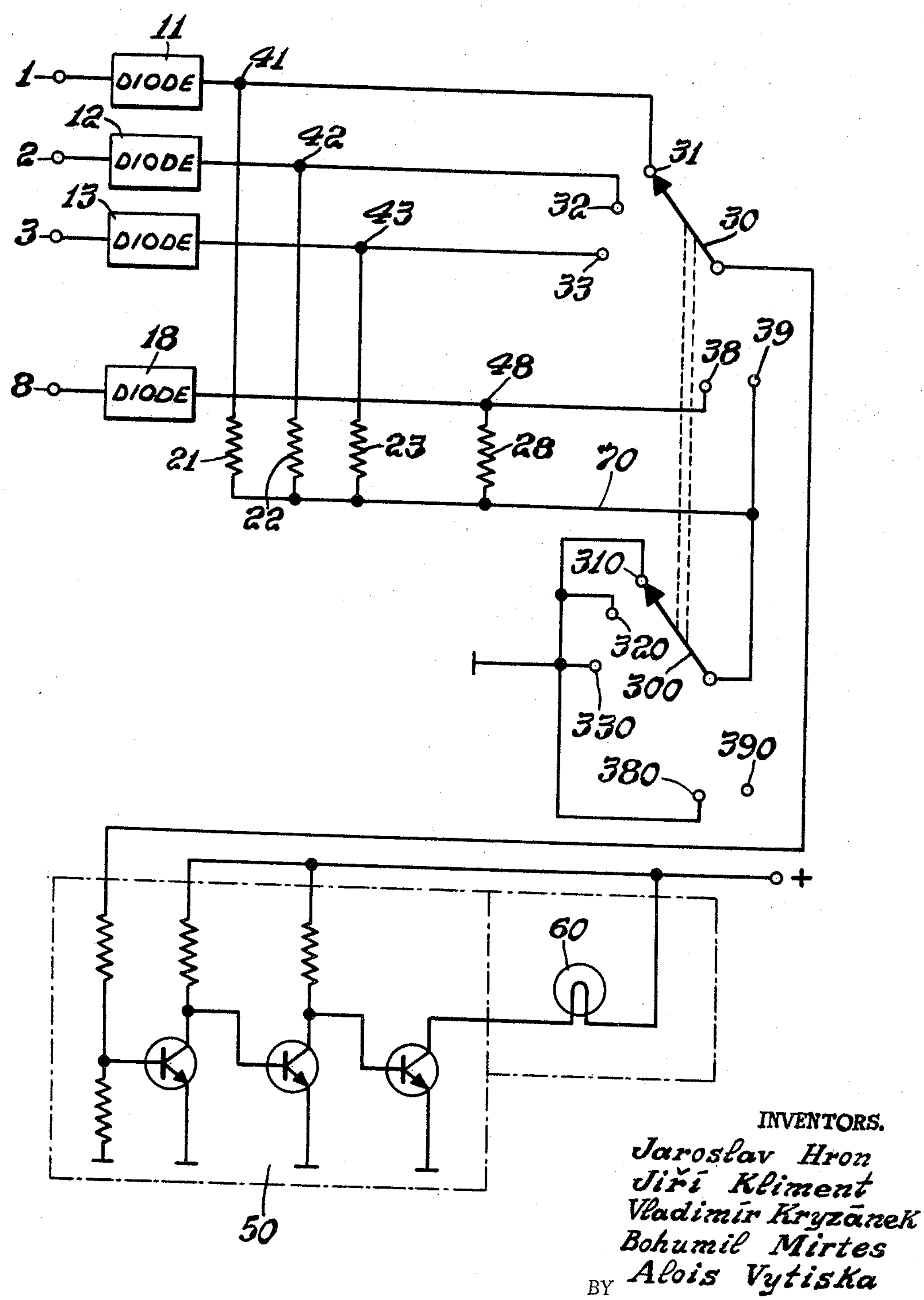
INVENTORS.
Jaroslav Hron
Jiří Kliment
Vladimír Kryzánek
Bohumil Mirtes
BY Alois Vytiska
Richard Lowe
Ag't United States Patent Office 3,436,751

Patented Apr. 1, 1969

3,436,751

CIRCUIT ARRANGEMENT FOR INDICATING THE OCCURRENCE OF AN OVERLOAD CONDITION ON A PLURALITY OF INPUT POINTS

Jaroslav Hron, Jiří Kliment, Vladimír Kryzánek, Bohumil Mirtes, and Alois Vytiska, Prague, Czechoslovakia, assignors to Vyzkumny ustav matematickych stroju, Prague, Czechoslovakia Filed July 26, 1965, Ser. No. 474,839

Int. Cl. G08b *21/00*

U.S. Cl. 340—248 1 Claim

ABSTRACT OF THE DISCLOSURE

A circuit arrangement for indicating the occurrence of an overload condition on a plurality of input points to be sensed includes a two-level change-over switch. For one position of the switch an output indication occurs whenever any one of a plurality of signals respectively applied to the input points exceeds a predetermined voltage threshold level. Each of the other positions of the switch corresponds to a different one of the input points. For each of these latter positions an output indication occurs if the corresponding one of the respective input signals exceeds the noted level.

This invention relates to an electric indication arrangement for successively and individually indicating any excess of the level of the electric signal on a series of controlled electric outputs, and for indicating any excess of the level of the electric signals of all controlled electric outputs that are connected in parallel to a single point, for instance, for indicating the overloading of D.C. operational amplifiers, particularly transistor type amplifiers.

In computers there is always a large number of operational amplifiers. Therefore, when switching-in and operating such a computer, it is always necessary to control the state and the function of the individual amplifiers. A typical D.C. operational amplifier comprises two amplifying branches, a main branch (basic amplifier) and a correcting branch (balancing amplifier) designed for the elimination of drifts. From the function of the amplifier it is evident that the signal which determines a faulty function of the amplifier can be taken from some point of the correcting branch of the D.C. amplifier. Since the correcting branch of D.C. amplifiers is mainly constituted by an amplifier and a modulator on the input and by a demodulator on the output, the signal that decides about the function of the amplifier is due to the A.C. voltage the frequency of which is determined by the modulator. In the case of a faulty function of the D.C. amplifier, the amplitude of the signal increases, for instance, by one order or more. The circuit for indicating the overload must evaluate the difference in the amplitude of the faulty signal.

In D.C. operational amplifiers of the electron valve type, glow discharge tubes are mostly used for indicating the function of the amplifier. The glow discharge tubes light up at the moment when the amplifier does not operate as usual. As the power take-off of glow discharge tubes is small (only fractions of ma.) and the correcting branch of the amplifier can supply a large voltage amplitude, there is no difficulty in realizing the indication of amplifier overloads.

On the other hand, in amplifiers of the transistor type, the A.C. voltage amplitude in the correction branch of the amplifier is, due to the final transistor voltage, mostly limited to a few volts only, so that the use of glow tubes for overload indication appears excluded. In this case, the indication can be obtained by the use of incandescent lamps fitted with a separating member which contains either a Zener diode or a transistor. A drawback of this solution, however, consists in the large number of semiconductors needed for the overload indication and the considerable power take-off from voltage sources when the computer is switched in, considering the fact that the power take-off of the indicating incandescent tube may by far exceed the maximum power take-off of the whole D.C. operational amplifier. These drawbacks are eliminated by using an arrangement arranged according to the present invention.

An object of the present invention is an improved electric indication circuit.

More specifically, an object of this invention is an electric circuit for providing an indication whenever any one of a plurality of input signals exceeds a predetermined voltage level and for additionally indicating which one of the input signals exceeded the level.

These and other objects of the present invention are realized in a specific illustrative circuit embodiment thereof which includes a plurality of circuit points to be sensed. The noted points are connected to a two-level change-over switch having on one level thereof a plurality of taps respectively connected to the circuit points. The corresponding taps on the other level of the switch are connected together and to a point of reference potential. Furthermore, each of the levels contains a movable arm for contacting the taps associated therewith. The movable arm of the first-named level is connected to the input of an indicating circuit, whereas the movable arm of the other level is connected to a common conductor which extends via respective resistors to the aforementioned circuit points. The two movable arms are mechanically gauged together.

Moreover, each of the first and second levels of the change-over switch contains an additional tap. The additional tap on the first level is connected to the common conductor, and the additional tap on the second level is electrically insulated or isolated from all other points of the herein-considered embodiment.

Accordingly, when the movable arms of the change-over switch are in contact with any of the taps, except the additional taps, the signal appearing at a particular one of the circuit points is coupled to the input of the indicating circuit. If the signal applied to this particular circuit point exceeds a predetermined threshold level, an overload indicator connected to the indicating circuit is energized.

On the other hand, when the movable arms of the switch are in respective contact with the additional taps, the overload indicator is energized if the signal applied to any one of the circuit points exceeds the predetermined threshold level.

A complete understanding of the present invention and of the above and other aspects thereof may be gained from a consideration of the following detailed description of an illustrative embodiment thereof, presented hereinbelow in connection with the accompanying drawing which depicts in a single figure a specific exemplary circuit made in accordance with the principles of the present invention.

As can be seen from the drawing, the invention is to be seen in the fact that electric outputs 1, 2, 3 . . . 8 of the individual controlled points are connected, on the one hand, directly to contacts 31, 32, 33 . . . 38, 39 of one level of a multipoint change-over switch and, through a branch or movable arm 30, to the input of an indicating circuit 50, and, on the other hand, to a joint conductor 70 across resistances 21, 22, 23 . . . 28. This joint conductor 70 is connected through a branch 300 of the second level of the change-over switch and through contacts 310, 320, 330 . . . 380, 390 of the second level of the change-over switch to a joint voltage, whereby one contact 39 of the first contact level is connected to this joint conductor 70 whereas a corresponding contact 390 of the second level is insulated.

The function of the circuit permits a central indication of any voltage level excess on the individual electric outputs 1, 2, 3 . . . 8 of the controlled points if the branches 30, 300 of the change-over switch are in the position 39, 390, respectively. An overload indicator 60 indicates any excess of an electric signal level on any of the outputs 1, 2, 3 . . . 8 of the controlled points. When successively changing-over the branches 30, 300 of the change-over switch to the individual contacts 31, 32 . . . 310, 320 . . . which correspond to the individual outputs 1, 2, 3 . . . 8 of the controlled points, one can state on which output there occurred a voltage level excess.

If indicating the overload of operational amplifiers, the faulty signal with regard to the function of the amplifier is the A.C. voltage the phase of which can differ by 180°. In order to secure the correct function of the indication, there are diodes 11, 12, 13 . . . 18 introduced into the circuit due to which the signal at the points 41, 42, 43 . . . 48 always maintains the same polarity.

The indicating or evaluating circuit 50 secures the function of the overload indicator in such a way that, for instance, the indication lamp 60 lights up when the voltage on the inputs 1, 2, 3 . . . 8 exceeds a certain predetermined value.

We claim:

1. In an electric indication arrangement for indicating the occurrence of an overload voltage condition on a plurality of circuit points to be sensed, a switch comprising first and second mechanically-gauged levels, said first level including a plurality of taps and an additional tap and a movable arm for engagement and contact with said taps, said second level also including a plurality of taps and an additional tap and a movable arm for engagement and contact with said taps, means respectively connecting said plurality of taps on said first level to said circuit points via respective diode elements, a common conductor having one end thereof connected to said additional tap on said first level and the other end thereof connected via respective resistance elements to said plurality of taps on said first level, means connecting said one end of said common conductor to the movable arm of said second level, means connecting said plurality of taps on said second level together and to a point of reference potential, said additional tap on said second level being electrically insulated, an indication circuit, and means connecting the movable arm on said first level to said indication circuit.

References Cited

UNITED STATES PATENTS 2,786,988 3/1957 Bergman ---------- 340—413

FOREIGN PATENTS 747,725 4/1956 Great Britain.

JOHN W. CALDWELL, *Primary Examiner.*

DANIEL K. MYER, *Assistant Examiner.*

U.S. Cl. X.R.

340—413